No. 660,511. Patented Oct. 23, 1900.
D. W. HOOVER.
HAY STACKER.
(Application filed Apr. 19, 1900.)
(No Model.) 3 Sheets—Sheet 1.

No. 660,511. Patented Oct. 23, 1900.
D. W. HOOVER.
HAY STACKER.
(Application filed Apr. 19, 1900.)
(No Model.)
3 Sheets—Sheet 3.

Witnesses
J. A. Griesbauer Jr.
C. E. Hunt

Inventor
David W. Hoover
by H. B. Willson & Co.
Attorneys

UNITED STATES PATENT OFFICE.

DAVID W. HOOVER, OF LYONS, NEBRASKA, ASSIGNOR TO ELISHA CROWELL, OF SAME PLACE.

HAYSTACKER.

SPECIFICATION forming part of Letters Patent No. 660,511, dated October 23, 1900.

Application filed April 19, 1900. Serial No. 13,497. (No model.)

*To all whom it may concern:*

Be it known that I, DAVID W. HOOVER, a citizen of the United States, residing at Lyons, in the county of Burt and State of Nebraska, have invented certain new and useful Improvements in Haystackers; and I do declare the following to be a full, clear, and exact description of the invention, such as will enable others skilled in the art to which it appertains to make and use the same.

The invention relates to haystackers.

The object of the invention is to provide a simple, durable, and comparatively inexpensive device of this character with means for so counterbalancing it as to render its operation easy and effective.

To this end the invention consists in certain features of construction and combination of parts, which will be hereinafter fully described and claimed.

Figure 1:
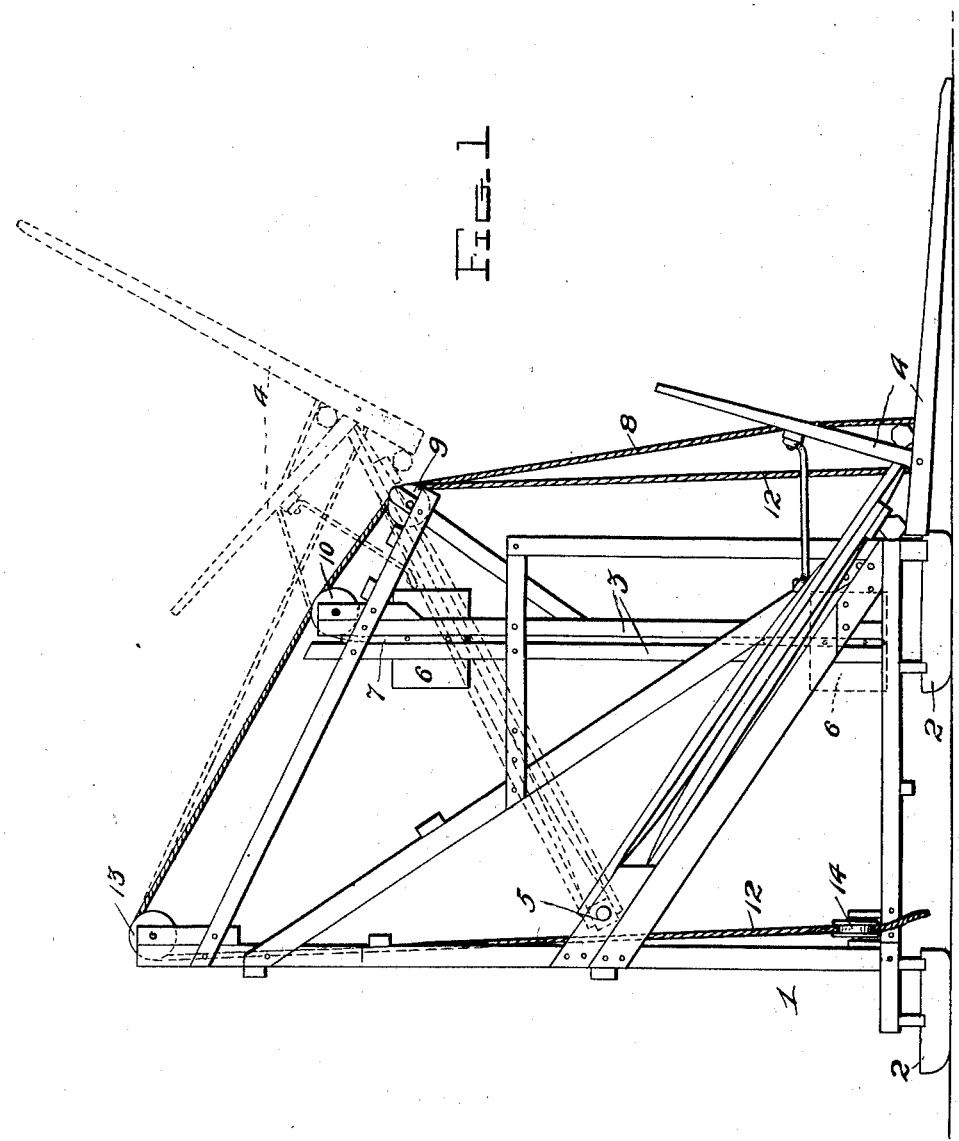
Figure 2:
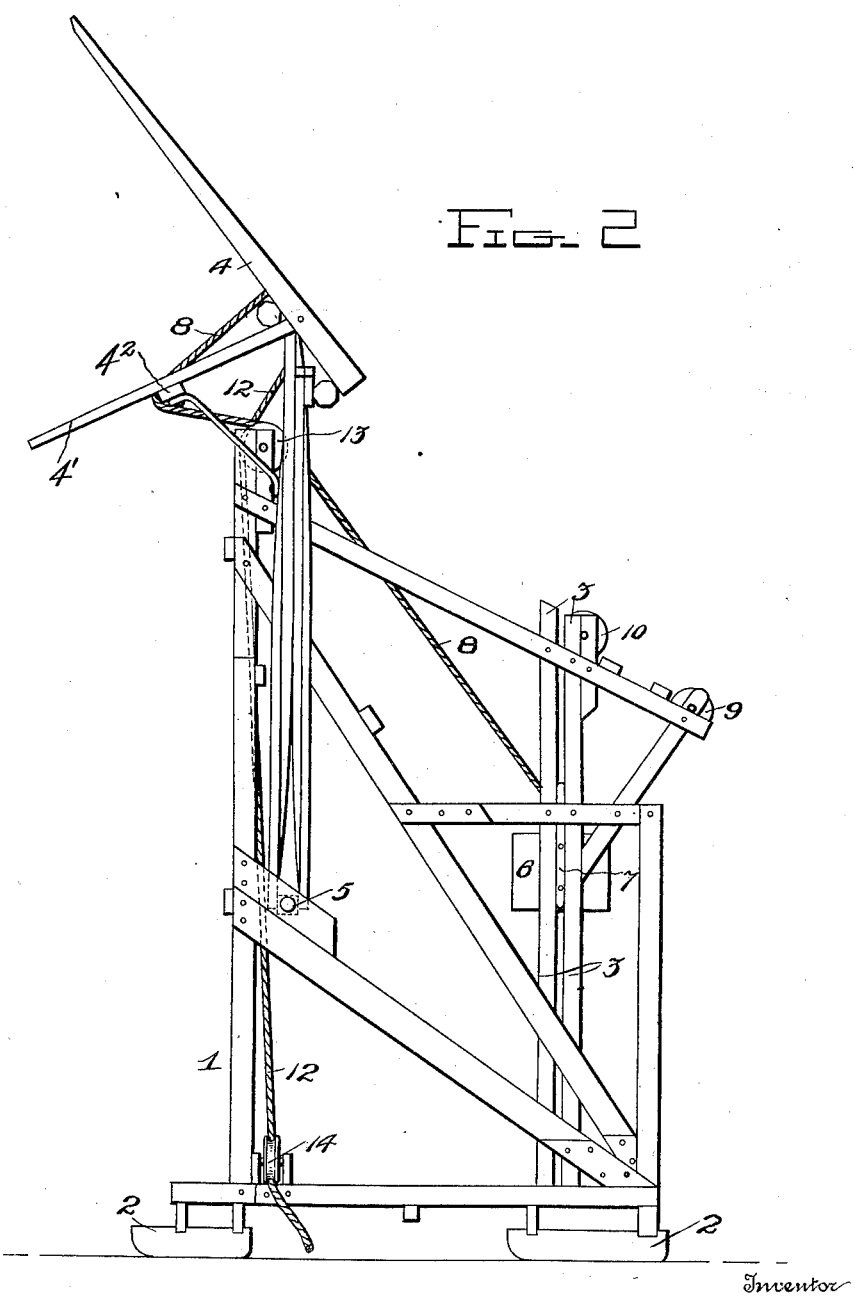
Figure 3:
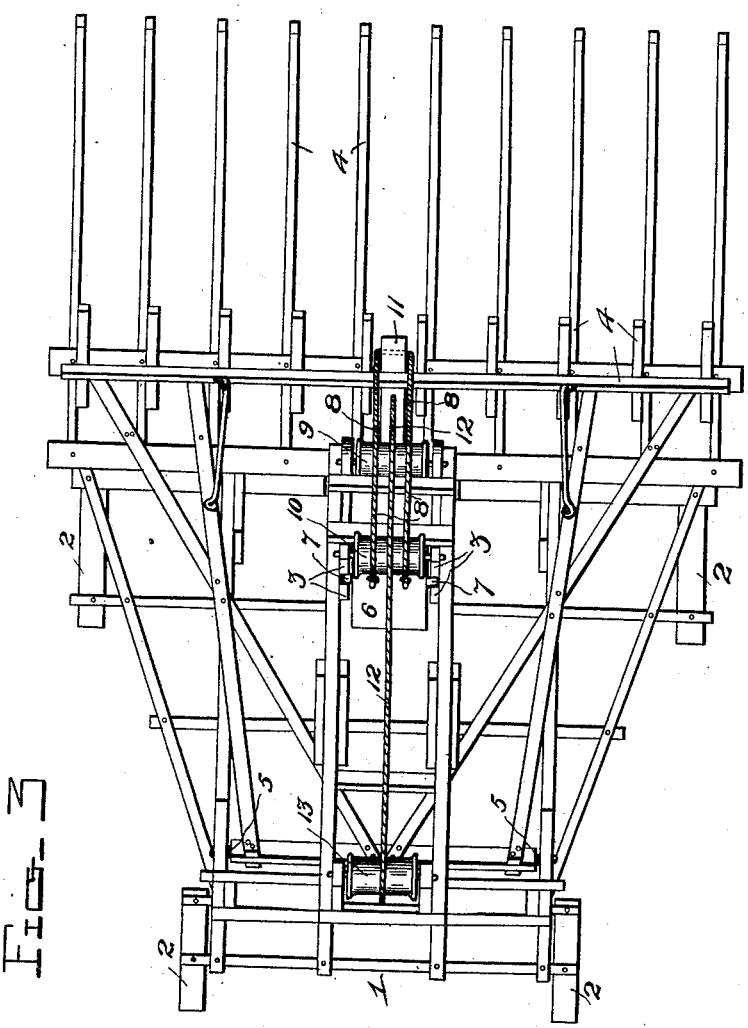

In the accompanying drawings, Figure 1 is a side elevation of my improved haystacker, showing in full lines the fork in its lowermost position and the counterbalancing-weight in its uppermost position and in dotted lines the fork in an elevated position and the counterbalancing-weight in its lowermost position. Fig. 2 is a similar view showing the fork in its uppermost position. Fig. 3 is a top plan view.

In the drawings the same reference characters indicate the same parts of the invention.

1 denotes the frame of the stacker, which is preferably mounted upon runners 2 and is provided with vertical guides 3, suitably braced in any desired manner.

4 denotes the hay-fork, which may be of any suitable or desired construction and is pivoted to the supporting-frame at 5, so as to have a swinging movement with respect to said frame and toss the hay placed on the fork over upon the stack.

4' denotes the vertical teeth of the fork, and $4^2$ denotes a cross-bar attached to said vertical teeth.

6 denotes the counterbalancing-weight, having ribs 7 mounted to slide in the guides 3.

8 denotes a rope connected to the counterbalancing-weight and passed over pulleys 9 and 10 and connected to an arm 11, secured to the fork.

12 denotes a rope connected to the fork, passed over the pulleys 9 and 10 and over a rear pulley 13, thence downwardly and around a pulley 14, and adapted to have its end attached to a horse or team.

The operation of the device is as follows: After the hay has been pitched upon the fork the operating-rope is drawn and the fork will be elevated from the position shown in full lines in Fig. 1 to that shown in dotted lines in the same figure, and in its movement between these two points the fork will be assisted in its elevation by the counterbalancing-weight. After it has reached the extreme position shown in dotted lines in Fig. 1, at which point it is moving under increased momentum, the fork begins to raise the weight (owing to the fact that the rope 8 engages the cross bar $4^2$) until the weight reaches the position shown in Fig. 2 and the fork has reached its highest point or the point of discharge. The weight now is in the position shown in Fig. 2 and serves to return the fork to the position shown in dotted lines in Fig. 1, and when it reaches this position the weight is at its lowermost point and the fork is prevented from falling with a sudden jar from the position shown in dotted lines in Fig. 1 to the position shown in full lines in said figure by reason of the elevation of the weight, which takes place the moment the fork has passed the position shown in dotted lines in Fig. 1. The counterbalancing-weight therefore has a threefold function—first, to assist in the elevation of the fork; second, to start the fork on its return movement, and, third, to limit the movement of the fork as it is being lowered to its normal position, and thereby prevent it crashing against the ground.

From the foregoing description, taken in connection with the accompanying drawings, the construction, operation, and advantages of my improved haystacker will be readily apparent without requiring an extended explanation.

It will be seen that the stacker is simple of construction, that said construction permits of its manufacture at comparatively small cost, and that it is exceedingly well adapted for the purpose for which it is designed.

Various changes in the form, proportion, and the minor details of construction may be resorted to without departing from the principle or sacrificing any of the advantages of this invention.

Having thus described the invention, what is claimed, and desired to be secured by Letters Patent, is—

The combination with the supporting-frame provided with a vertical guideway, a weight mounted to slide in said guideway, a pulley journaled in the upper end of the guideway, a fork hinged to the frame and provided with vertical teeth, a cross-bar connected to the vertical teeth, a weight rove about said pulley and connecting the fork to the weight and engaging with said cross-bar, a pulley journaled in the upper and lower ends of the frame, and a draft-rope attached to the fork and passing over said pulleys, said weight being adapted to exert its influence to elevate the fork a certain distance in its upward movement and then retard the fork in its final upward movement, and then to start the fork on its return movement and finally to check the downward or return movement of the fork and prevent it crashing against the ground, substantially as set forth.

In testimony whereof I have hereunto set my hand in presence of two subscribing witnesses.

DAVID W. HOOVER.

Witnesses:
J. B. MILLER,
E. A. YEATON.